United States Patent
Manor et al.

(10) Patent No.: US 8,446,134 B2
(45) Date of Patent: May 21, 2013

(54) HIGH EFFICIENCY AC/DC POWER SUPPLY

(75) Inventors: Dror Manor, Herzlia (IL); Pascal Lebens, Guttecoven (NL); Ronny Van Rooij, Roermond (NL)

(73) Assignee: Techtium Ltd., Tel-Aviv (IL)

( * ) Notice: Subject to any disclaimer, the term of this patent is extended or adjusted under 35 U.S.C. 154(b) by 282 days.

(21) Appl. No.: 12/921,402

(22) PCT Filed: Mar. 10, 2009

(86) PCT No.: PCT/IL2009/000268
§ 371 (c)(1),
(2), (4) Date: Nov. 18, 2010

(87) PCT Pub. No.: WO2009/113062
PCT Pub. Date: Sep. 17, 2009

(65) Prior Publication Data
US 2011/0051476 A1    Mar. 3, 2011

Related U.S. Application Data

(60) Provisional application No. 61/064,498, filed on Mar. 10, 2008, provisional application No. 61/146,357, filed on Jan. 22, 2009.

(51) Int. Cl.
*G05F 1/652* (2006.01)
*G05F 1/656* (2006.01)

(52) U.S. Cl.
USPC ........... 323/271; 323/222; 323/266; 323/282; 363/16; 363/41; 363/21.04; 363/21.07; 363/21.12; 363/21.15

(58) Field of Classification Search
USPC .................... 363/16, 41, 21.04, 21.07, 21.12, 363/21.15; 323/222, 266, 271, 282
See application file for complete search history.

(56) References Cited

U.S. PATENT DOCUMENTS

| 4,736,286 A | 4/1988 | Gulczynski |
| 5,267,132 A | 11/1993 | Gulczynski |

(Continued)

FOREIGN PATENT DOCUMENTS

| CN | 1806380 A | 7/2006 |
| WO | 2004/112227 A1 | 12/2004 |

OTHER PUBLICATIONS

PCT Int'l Search Report and Written Opinion of the ISA, mailed Jul. 13, 2009 in WO 2009/113062.

(Continued)

*Primary Examiner* — Bao Q Vu
(74) *Attorney, Agent, or Firm* — Daniel Feigelson

(57) ABSTRACT

A power supply for converting AC to a regulated DC output current, utilizing two serial switched mode power supplies, the first providing an intermediate DC output voltage with only moderate ripple properties, this output being input to the second, which operates as a DC/DC converter to provide the desired output with low ripple and good regulation. The diode rectifier assembly has no reservoir/smoothing capacitor, or one of much smaller capacitance than in prior art power supplies. The large resulting rectifier output ripple is overcome by use of the two power supply units, at least the first having a smoothing capacitor at its output. A majority of the energy stored in this capacitor is utilized during each AC half cycle. Such power supplies also provide improved hold-up times. The power supply is also constructed to have low standby power consumption, by use of a double burst configuration.

34 Claims, 6 Drawing Sheets

U.S. PATENT DOCUMENTS

| | | | |
|---|---|---|---|
| 5,565,761 A * | 10/1996 | Hwang | 323/222 |
| 5,654,591 A * | 8/1997 | Mabboux et al. | 307/66 |
| 5,903,138 A | 5/1999 | Hwang et al. | |
| 6,005,782 A | 12/1999 | Jain et al. | |
| 6,304,460 B1 | 10/2001 | Cuk | |
| 6,388,896 B1 | 5/2002 | Cuk | |
| 6,400,579 B2 | 6/2002 | Cuk | |
| 6,462,962 B1 | 10/2002 | Cuk | |
| 6,798,177 B1 * | 9/2004 | Liu et al. | 323/222 |
| 7,224,086 B2 * | 5/2007 | Germagian et al. | 307/128 |
| 7,885,085 B2 * | 2/2011 | Orr et al. | 363/21.02 |
| 8,102,164 B2 * | 1/2012 | Colbeck et al. | 323/282 |
| 8,212,493 B2 * | 7/2012 | Melanson et al. | 315/247 |
| 2002/0021576 A1 | 2/2002 | Gattavari et al. | |
| 2002/0150116 A1 | 10/2002 | Huang | |
| 2004/0252532 A1 | 12/2004 | Lee et al. | |
| 2008/0198638 A1 * | 8/2008 | Reinberger et al. | 363/74 |
| 2009/0091957 A1 * | 4/2009 | Orr et al. | 363/79 |
| 2009/0300378 A1 * | 12/2009 | Huang et al. | 713/300 |
| 2010/0026208 A1 * | 2/2010 | Shteynberg et al. | 315/297 |
| 2010/0327765 A1 * | 12/2010 | Melanson et al. | 315/291 |
| 2011/0101884 A1 * | 5/2011 | Kim et al. | 315/294 |
| 2012/0044728 A1 * | 2/2012 | Yatsu et al. | 363/126 |
| 2012/0267955 A1 * | 10/2012 | Zhan et al. | 307/31 |

OTHER PUBLICATIONS

Translation of Office Action issued on Dec. 5, 2012 in corresponding Chinese patent application No. 200980116810.0.

* cited by examiner

HIGH EFFICIENCY AC/DC POWER SUPPLY

This is a 35 U.S.C. §371 application of PCT/IL2009/000268, filed Mar. 10, 2009, and claims the benefit under 35 U.S.C. §120 of said PCT application, and further claims the benefit under 35 U.S.C. §119(e) of U.S. Provisional Patent Applications USSN 61/064,498, filed Mar. 10, 2008, and U.S. application Ser. No. 61/146,357, filed Jan. 22, 2009. The contents of these priority applications are incorporated herein by reference.

FIELD OF THE INVENTION

The present invention relates to the field of power supplies, especially wall-plug AC adapters, and especially those designed to provide high wall-plug efficiency and low standby power consumption.

BACKGROUND OF THE INVENTION

DC power supplies powered by the AC mains, for use in powering portable electronic devices such as mobile phones, laptop computers, or to charge batteries such as are known popularly as wall chargers or adaptors, or travel converters, are possibly the most common power supplies in use today. Such power supplies, if of the "high efficiency" type, generally use a rectifier bridge, with a capacitor output for reservoir and smoothing purposes, feeding a DC/DC converter of the switched mode type, generally a pulse width modulation (PWM) power supply, also capacitor smoothed at its output, to generate a regulated, low voltage DC output. Although the efficiency of such power supplies is high compared with previously available linear regulated power supplies, there has recently been a tendency, related to concern for the environment, to increase efficiencies even more, and especially to reduce the standby dissipation of the units when they are connected to the mains supply but are not delivering current to a load.

There exists a constant need for a power supply which increases still further the wall-plug efficiency and reduces the standby power consumption compared with prior art power supplies.

The disclosures of each of the publications mentioned in this section and in other sections of the specification, are hereby incorporated by reference, each in its entirety.

SUMMARY OF THE INVENTION

The present invention seeks to provide a new power supply for converting an AC supply to a desired regulated DC output current. The power supply utilizes two power supply units in series, the first one being an AC/DC converter, taking the AC mains input and providing an intermediate DC output voltage with only moderate or even poor ripple properties, this output being input to the second power supply unit, which operates as a DC/DC converter to provide the desired output with low ripple and good regulation. The term "ripple" is understood throughout this application, and may also be thuswise claimed, to refer to the voltage drops at an output arising from the cross-over points of the AC mains supply, where the input voltage crosses the zero voltage position in time, and current is thus generally supplied from an alternative source during this period, such as from a storage capacitor. The diode rectifier bridge or other rectifying assembly arrangement, differs from those in prior art power supplies of this type in that it effectively uses no associated reservoir/smoothing capacitor at its output. If a capacitor is used at the rectified output, it is of a value significantly smaller than that of such prior art power supplies, and is generally functional as part of the input RFI filter, rather than having a smoothing function. However, the essential absence of reservoir/smoothing capacitance at the rectifier assembly output results in a rectified output current with a large ripple. This large resulting output ripple is overcome in the power supply of the present invention by the use of the two serial power supplies, and any smoothing function desired to reduce this rectifier output ripple is achieved by use of a capacitor at the output of the first power supply. It is then this capacitor at the output of the first power supply, which fulfils the reservoir/smoothing function in the circuit. This smoothing function is essential for an AC/DC conversion power supply in order to continue supplying current to the load when the AC voltage would otherwise have fallen below that required to provide the rated output voltage. The power supply units may be switched mode power supplies, these having good efficiency and being readily controlled, though it is to be understood that the circuit architecture explained in this application is generally applicable using any kind of power supply unit or voltage converter. The term converter is used in this application, and may also be thus claimed, to generically mean a voltage conversion, power supplying device, whether AC/DC or DC/DC.

The use of two serial power supply modules makes it possible to use a first power supply with only a minimal level of regulation, and an output with a comparatively high level of ripple, while the desired level of regulation and low ripple is then obtained at the output of the second power supply. This combination enables any storage capacitors used in the power supply, whether at the output of the rectifier assembly, or at the output of the first switched mode power supply module, to be of substantially smaller value than in prior art power supplies, thereby saving space and improving efficiency. Any such capacitance fitted at either of these two locations has two properties which are characteristic of the present invention. Firstly, unlike conventional reservoir/smoothing capacitors, which, to maintain a low ripple level, are allowed to discharge only a small part of their stored energy every cycle or half cycle, the capacitor or capacitors of the power supply of the present invention are such as to allow a majority of the energy stored in them to be utilized during each AC cycle or half cycle. Secondly, unlike the conventional reservoir/smoothing capacitors used in prior art small power supplies, which draw current from the mains during only a small part of the AC cycle as they are being topped up, the capacitor or capacitors of the power supply of the present invention are such as to draw current during the major part of the AC cycle. Although there exist power factor correction circuits which use active up-converter control to force the reservoir/smoothing capacitors to draw current from the mains over essentially the entire AC cycle or half cycle in step with the output voltage, such circuits generally operate with a large conventional reservoir/smoothing capacitor, such that they do not discharge the major part of their stored energy during every cycle or half cycle, unlike the capacitors of the present invention. A typical prior art power supply may use of the order of 30% of the stored capacitor energy, while as will be shown hereinbelow, the configurations of power supplies described in this application typically use more than 80% of the stored capacitor energy.

Of the configurations mentioned for the use of storage capacitors in the power supplies described in this disclosure, an advantageous arrangement is for the rectifier output to have only a minimal capacitive presence, if at all, generally for use in the RFI input filter, and for the capacitor at the output of the first switched mode power supply module to serve as the main reservoir/smoothing capacitor of the power supply.

A further advantage of the various power supplies of the present disclosure is that the first switched mode power supply outputs an intermediate voltage higher than that of the rated output. As a result, the current supplied by this first switched mode power supply is less than that of prior art units using only a single switched mode power supply, such that resistive dissipation losses are thus reduced, both in the ripple current through the main reservoir/smoothing capacitor, because of the elimination of the use of high value aluminum capacitors with their comparatively high leakage currents, and in the losses from any serial components through which the intermediate current flows, as will be explained hereinbelow. The use of a DC/DC converter with a low input/output voltage ratio as the second switched mode power supply allows this second supply to have a very high efficiency, such that the overall power supply efficiency is high.

The use of two serial power supply modules, in which the first outputs an intermediate voltage higher than that required by the device at the output of the second power supply module, enables a further useful configuration of the power supplies described in this disclosure, in which the two power supply modules are physically separated. This configuration has the following advantages. The first power supply module can be incorporated into the plug which is inserted into the AC wall socket, while the second power supply module can be that which is plugged into the load or device to be powered. In prior art AC/DC wall charger power supplies, all of the circuitry is generally incorporated into the plug inserted into the wall socket, and the wire conveying the output power to the load device has to carry the entire rated current which the load device requires. According to this split power supply configuration, the wire connecting the first power supply module at the wall socket with the second power supply module plugged into the load device, because of the higher voltage between the two modules, does not need to carry a current of the same level as that in prior art designs. This wire can then be of thinner cross-section than that of prior art designs, such that it wastes less energy in resistive dissipation. Furthermore, it can be more flexible so that it could, for instance, be rolled up on a reel incorporated in the wall plug unit. Also since the final regulated voltage to the device is supplied through the buffering action of the second switched mode power supply, an additional voltage drop on a thin connecting wire, even though larger than in a conventional connection cord, need not effect the level of the output voltage to the device.

Another advantage of the novel power supply architecture described above is that the power supply may be constructed such that it has a very low standby power consumption, by the use of a double burst configuration. According to this configuration, the voltage across the outputs of each of the switched mode power supplies is monitored, preferably by low voltage detector elements, and as soon as the voltage level rises above a predetermined level for each supply, indicating the absence of an output load, the supplies are both completely shut down, thereby reducing the power consumption of the complete power supply to that caused by component leakage only. The two component supplies are awakened when a load current demand is noted by the drop in the monitored voltage to below a second predetermined value for each supply. When no load is attached, and the voltage detectors nevertheless reach the switch-on threshold because of current leakage, the power supplies give a burst of current which raises the output voltages to the upper cut-off level, and this shuts down the supplies again. These bursts are of very short duration, such that the overall consumption is very low.

Furthermore, because of the construction and circuit architecture, as described in detail hereinbelow, the power factor of the power supplies described in this disclosure can be made better than that of prior art, single stage, AC/DC power supplies. Such small types of AC/DC power supplies for powering mobile electronic devices do not generally use power factor correction circuits. The improvement in the power factor of the power supplies of the present invention is achieved without the incorporation of additional active power factor correction circuitry. Such power factor improvement also assists in the conservation of resources.

A further exemplary switched mode power supply is described, in which the control feedback to the converter input is achieved without the need to use an optocoupler, which is a comparatively large and expensive component for domestic power supply use. An application is described in which use is made of the main transformer of the pulse width modulation supply in order to provide feedback from the voltage on the output capacitor back to the switched mode power supply control in order to start the switched mode supply when there is need to wake it from its sleep mode. While the switched mode supply is in its sleep mode, the high frequency transformer is unused, and thus is free to perform this function.

There is an increasing requirement today that power supplies used for powering critical devices, generally those other than battery driven devices, should have significant hold-up times, such that the c=devices continue to operate during short term mains supply drop-out. If the exemplary power supplies described in this disclosure are adapted for use with lengthy hold-up times, an immediate advantage over prior art power supplies becomes evident. Since the main energy storage capacitors are located at the output of the first converter, they are always charged to the same nominal DC voltage, i.e. the output voltage of the first converter, essentially independently of changes in the AC supply input voltage, such that the capacitor can be chosen to provide the exact required amount of energy to bridge the hold-up time, regardless of mains operating conditions. Thus even if the mains supply were to dip to its minimum value before dropping off completely, the storage capacitors of these power supplies will always be charged at essentially the same voltage level, namely the first converter rated output voltage. The effect of the first converter is to isolate the storage capacitors from the stability of the A/C mains power supply, thus providing these power supplies with the ability to achieve hold-up times with significantly less rigorous capacitor requirements than prior art supplies.

There is thus provided, in accordance with one exemplary implementation of the present claimed invention, a power supply for converting an AC supply to a DC output, the power supply comprising:
(i) a rectifier assembly connected to the AC supply, and providing a rectified current,
(ii) a first converter inputting the rectified current, and providing a first DC output current,
(iii) a second converter inputting the first DC output current, and providing a second DC output current, and
(iv) at least one capacitor disposed at the output of the first converter for reducing the voltage drop of the first DC output current during zero-crossing of the input AC supply, wherein the capacitance of the at least one capacitor is such that a major part of its stored energy is discharged during every half cycle of the AC supply.

This power supply may be such that the first converter inputs the rectified output current during at least a major part of each half cycle of the AC supply. Additionally, the rectified current at the input to the first converter may have a voltage drop during zero-crossing of the input AC supply, being a significant fraction of its peak voltage. This voltage drop may be of at least 50% of its peak voltage level.

In such power supplies, the first converter may advantageously provide an output voltage higher than that of the second converter. This output voltage could be at least one third higher than that of the second converter. In either of these cases, the resulting reduced current flowing in the first converter may result in reduced power dissipation therewithin.

The power supply may advantageously be such that the second converter operates with an output to input voltage ratio sufficiently small that the second converter has an efficiency substantially higher than that which would be obtained if the rectified output current were input directly thereto.

According to further exemplary power supplies described herewithin, the at least one capacitor on the output of the first converter may have a value such that the first DC output current has a voltage drop during zero-crossing of the input AC supply of at least 25% of the output voltage of the first converter when the power supply is providing a DC output current at its rated level. Alternatively, the at least one capacitor on the output of the first converter may have a value such that the first DC output current has a voltage drop during zero-crossing of the input AC supply of at least 50% of the output voltage of the first converter when the power supply is providing a DC output current at its rated level.

Furthermore, any of the above-described power supplies may be such that the input by the first converter of rectified current during switch-on of the power supply reduces inrush current sufficiently that the power supply can dispense with the need of inrush current protection. Additionally, the utilization of rectified output current by the first converter over a major part of each cycle of the AC supply may be operative to increase the power factor of the power supply.

Still other example implementations involve a power supply as described above, and in which the rectifier assembly and the first converter are disposed in a module physically separated from the second converter, and connected thereto by a flexible connection cord. In such a power supply, the module may further include the at least one capacitor. It may conveniently be part of a wall plug receiving AC power from a wall socket, and the second converter may then be part of a plug for connecting to a load device of the power supply, or it may be disposed within a mobile electronic device. The power supply may further comprise a retractable reel, on which the connection cord is stored when not in use.

Yet other implementations may involve a power supply comprising:
(i) at least first and second serially connected converters,
(ii) a first at least one capacitor connected across the output of the first converter,
(iii) a voltage detection element monitoring the voltage on the first at least one capacitor, causing the first converter to enter a sleep mode if the voltage on the first at least one capacitor exceeds a first predetermined level, and arousing the first converter from its sleep mode if the voltage on the first at least one capacitor falls below a second predetermined level,
(iv) a second at least one capacitor connected across the output of the second converter, and
(v) a voltage detection element monitoring the voltage on the second at least one capacitor, causing the second converter to enter a sleep mode if the voltage on the second at least one capacitor exceeds a first preselected level, and arousing the second converter from its sleep mode if the voltage on the second at least one capacitor falls below a second preselected level.

In such a power supply, when no load current is demanded, the first converter may be aroused to raise the voltage on the first at least one capacitor to the first predetermined level, and the second converter may be aroused to raise the voltage on the second at least one capacitor to the first preselected level. Furthermore, when no load current is demanded from the power supply, it enters a sleep mode with essentially no operating current expended other than that required to maintain responsivity of the converters to arousal signals, and that lost by component leakage.

Additionally, these power supplies may be such that each one of the first and the second converters is adapted to provide current only down to predefined lower current limits, and wherein if the current drawn from the power supply falls below a second limit, lower than either of the predefined lower current limits of the converters, at least one of the converters enters a sleep mode until aroused to fill its at least one capacitor. In such a case, the predefined lower current limit of either of the converters may be chosen such that it provides current only at a level which maintains a minimum predefined power supply efficiency. If the current drawn from the power supply falls below the second limit, the at least one converter may provide current in bursts greater than its predefined lower current limit, and may enter a sleep mode between bursts.

In yet more exemplary implementations of these last mentioned power supplies, the rectifier assembly and the first converter may be disposed in a module physically separated from the second converter, and connected thereto by a connection cord. In such power supplies, the module may further include the at least one capacitor. It may conveniently be part of a wall plug receiving AC power from a wall socket, and the second converter may then be part of a plug for connecting to a load device of the power supply, or it may be disposed within a mobile electronic device. The power supply may further comprise a retractable reel, on which the connection cord is stored when not in use.

Additionally, alternative implementations described in this application may involve a switched mode power supply comprising:
(i) an input for receiving a DC current,
(ii) switching circuitry for generating a high frequency AC current from the input DC current,
(iii) a high frequency transformer receiving the high-frequency AC current in a primary winding, the transformer having a secondary winding for outputting the high-frequency AC current at a desired voltage level,
(iv) a rectifier unit for rectifying the transformed the high-frequency AC current to a DC output current, and
(v) an additional primary winding on the high-frequency transformer coupled magnetically to the secondary winding,
wherein a signal injected onto the secondary winding may induce into the additional primary winding a signal electrically isolated from the secondary winding, and usable for control functions in the switched mode power supply.

Such a switched mode power supply may further comprise a rectifier assembly for connecting to an AC mains supply, for providing the DC input current. In such a case, the DC output current will be isolated from the AC mains supply, and this isolation may be advantageously achieved without the need for an optocoupler.

According to further useful implementations of the power supplies described in this disclosure, there may be a power supply for converting an AC supply to a DC output, the power supply comprising:
(i) a rectifier assembly connected to the AC supply, and providing a rectified current,
(ii) a first converter inputting the rectified current, and providing a first DC output current,
(iii) a second converter inputting the first DC output current, and providing a second DC output current, and
(iv) at least one capacitor disposed at the output of the first converter for reducing voltage drop in the first DC output current,
wherein the capacitance of the at least one capacitor may be such that the voltage drop in the first DC output current is limited so that the power supply continues to provide a predetermined fraction of its power output for a predetermined time period following cessation of the AC supply.

In such a power supply, the capacitance of the at least one capacitor may be such that a major part of its stored energy is discharged during the predetermined time period during which the power supply continues to provide a predetermined fraction of its output. Additionally, in such cases, the at least one capacitor may be charged to a predetermined constant voltage by the first converter, essentially independent of allowable changes in the AC supply voltage, and essentially independent of which AC supply voltage standard is used.

BRIEF DESCRIPTION OF THE DRAWINGS

The present invention will be understood and appreciated more fully from the following detailed description, taken in conjunction with the drawings in which.

DETAILED DESCRIPTION

Figure 1:
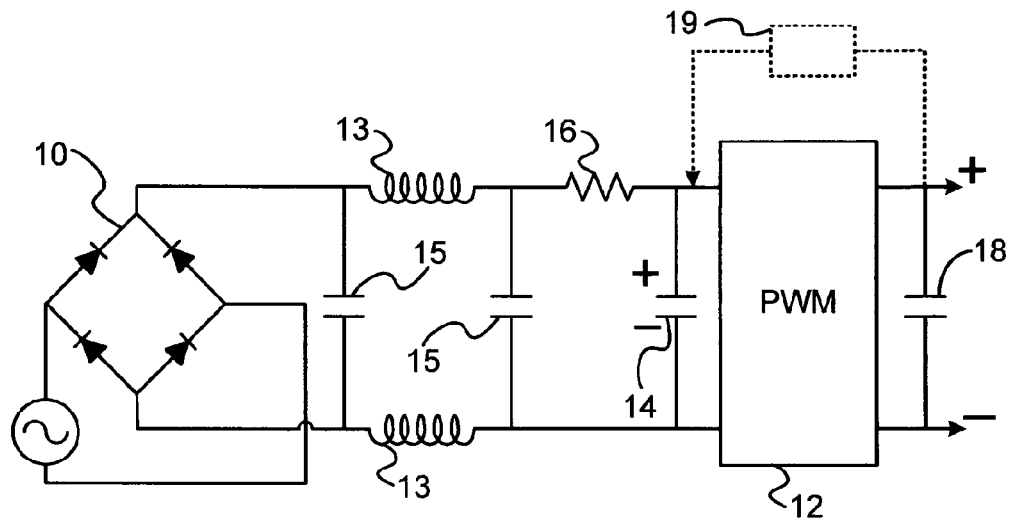
FIG. 1 illustrates a schematic outline circuit diagram of a prior art, wall power supply, using a capacitor smoothed rectifier bridge feeding a pulse-width modulated (PWM) DC/DC converter.

Reference is now made to FIG. 1, which illustrates a schematic outline circuit diagram of a prior art, wall AC power supply, using a capacitor smoothed rectifier bridge 10 feeding a pulse-width modulated (PWM) DC/DC converter 12. The rectified output from the bridge 10 may first be directed through an RFI filter, which is generally a pi-section filter, comprising one or two inductors 13, and a pair of small value capacitors 15. This filter prevents radiation of internally generated noise in the power supply back into the AC mains lines, and is generally mandated by regulatory requirements. In the embodiment shown in FIG. 1, only a single capacitor 14 is shown for reservoir/smoothing purposes, but it is to be understood that separate reservoir and smoothing capacitors can also be used with an inductance or resistor between them. The reservoir/smoothing capacitor(s) 14 are generally electrolytic capacitors. Since they operate at a high voltage, and since they need to have a high enough capacitance to provide a good level of smoothing, they are necessarily large components. For a typical 5 Watt, 5 Volt power supply operated by a 220 volt AC mains input, the smoothing capacitor 14 will typically be of the order of 10 μF to 25 μF and rated at least 350 volts operating voltage. Such a 10 μF capacitor has a comparatively large physical size, typically 10 mm diameter×8 mm. in length. Furthermore, the use of such a large capacitor value mandates the use of a current limiting component 16 such as a resistor at the input, in order to limit the inrush current into the capacitor at switch on. The topping-up current for the capacitor is done every half-cycle because full wave rectification is assumed, as is usual in such power supplies. This topping-up current occurs in relatively short pulses of high current since the object of the reservoir/smoothing capacitor(s) is to provide an output with as small a ripple as possible, commensurate with the size and cost of the capacitors. This means that the input current can only charge the capacitor over a small part of the half-cycle. A feedback loop, generally with optocoupler isolation 19, is required bridging between output and input of the PWM in order to provide the required control of the output voltage.

Figure 2:
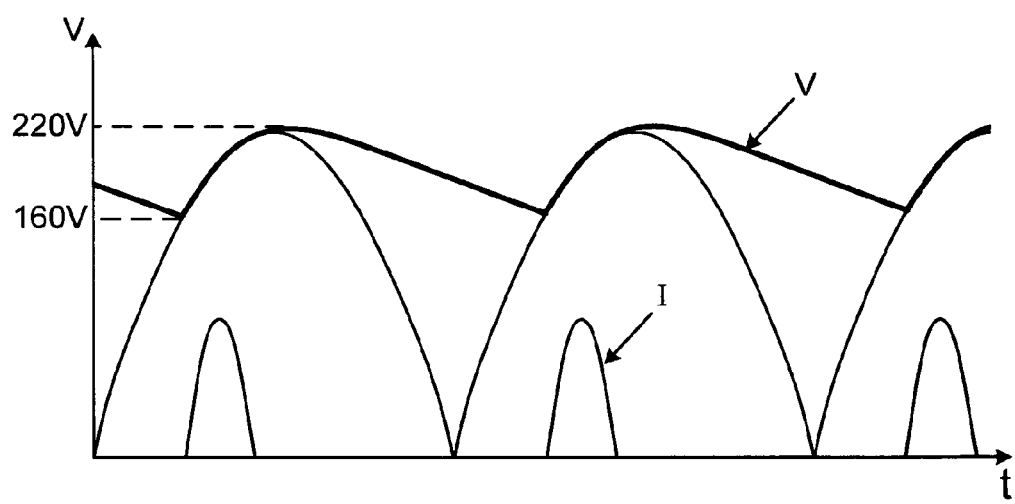
FIG. 2 shows the rectifier output of the prior art power supply of FIG. 1.

The output from the rectifier bridge is shown in FIG. 2. The ripple level is dependent on the value of the reservoir/smoothing capacitor used, and for the exemplary power supply described, and with a 25 μF capacitor, the ripple is approximately 30% of the DC output level. The larger the capacitor, the less the ripple which the PWM DC/DC converter needs to accommodate, and precision power supplies often use a larger capacitor and a much lower level of ripple. However, a well designed PWM power supply of 5 volt regulated output can handle an input voltage ripple of 50 volts or more without problem. Since, by virtue of the large smoothing capacitor(s) 14, the input ripple to the PWM converter is comparatively low, it is possible to use a comparatively small value capacitance 18 at the regulated output of the PWM power supply shown in FIG. 1. The current pulses I, drawn from the rectifier assembly each half cycle as the reservoir tops up, are also shown in FIG. 2.

Figure 3:
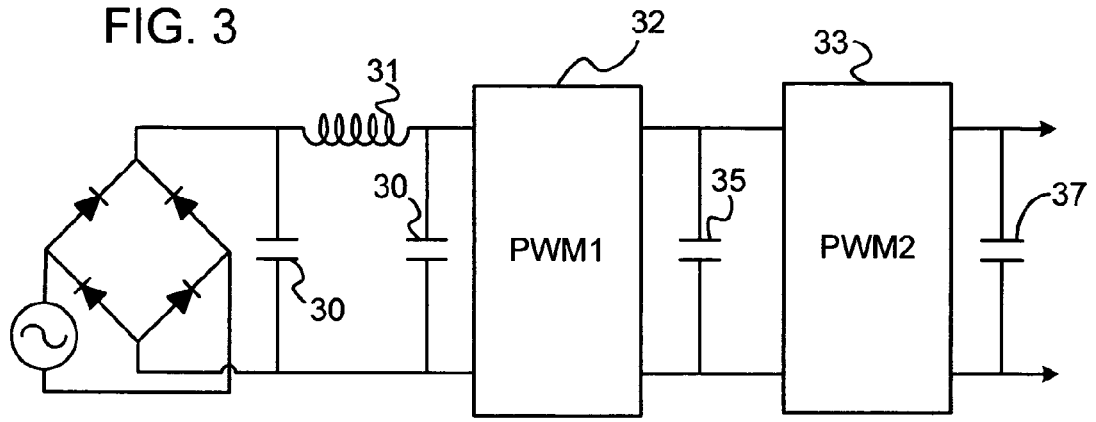
FIG. 3 illustrates a schematic outline circuit diagram of a wall charger power supply using two serial switched mode power supply units, constructed and operative according to a first preferred embodiment of the present invention.

Reference is now made to FIG. 3, which illustrates a schematic outline circuit diagram of an exemplary novel wall charger power supply of the type described in this disclosure. Such a power supply would typically be used to operate portable electronic devices or to charge batteries from an AC source of mains power. The charger may be constructed to input a very wide range of AC voltages, typically between 85 and 265 volts, to cover all generally available sources of mains power, and to output a current of 1 ampere at a regulated DC voltage of 5 volts, i.e. a 5 Watt output.

It is to be emphasized that although an example of a 5 volt, 5 Watt power supply is used in this section in order to describe the operation of the power supplies of the present disclosure, this is purely a common exemplary embodiment, and the invention is in no way intended to be limited by the values used for this particular embodiment.

Additionally, it is also to be understood that although full wave rectification is generally used in such power supplies, such that current pulses occur every half cycle of the AC supply, the same considerations regarding the power supply design would also be applicable for half wave rectification. The terms half-cycle and cycle are thus intended to be used interchangeably in this application, depending on the type of rectification used, and are also thuswise understood to be claimed interchangeably.

Furthermore, although the power supplies of these examples are described as utilizing pulse width modulated (PWM) power supply units, it is to be understood that they are also implementable with any other type of controllable power supply unit.

The charger is constructed to have a number of advantageous features, which are mandated either by regulatory requirements, current or impending, or by the market forces in operation. The charger is particularly designed to be environmentally friendly, having performance parameters which are not wasteful of resources. The following is a non-limiting list of features which the chargers of the present disclosure should provide:

(i) Very low standby current when connected to the mains supply but not supplying current to a load. An exemplary 5 volt, 5 watt power supply, is designed to dissipate less than 30 mW in standby condition, as compared with typically up to 300 mW consumption which is common in prior art chargers.

(ii) High wall plug efficiency. A typical power supply constructed as described in this application, is designed to have an efficiency of at least 80%, and preferably up to 85%, as compared with the typical 70% efficiency which is common in prior art chargers. An 85% efficiency would effectively cut the power losses during operation by half.

(iii) High power factor. An exemplary power supply of the present disclosure is designed to have a cosine $\phi$ of at least 0.85, as compared with the 0.5 to 0.6 power factor which is common in prior art AC/DC chargers. This poor power factor in prior art devices arises generally because of the large reservoir capacitors used at the output of the diode rectifier bridge, which draw large pulses of current over short temporal segments of each half cycle, during the time that the rectifier output tops up the reservoir capacitor. By the use of the active control features, as will be described herein below, and because of the characteristic of drawing current from the mains over such a large part of each AC half-cycle (for full wave rectification), a power supply constructed according to topologies described in the present disclosure should readily achieve a power factor of 0.9.

(iv) Low device volume. An AC wall adaptor charger according to the present application is designed to have a smaller volume than prior art chargers, this not only making the product more acceptable to the market, but also using less raw materials in its production.

(v) Good hold-up time characteristics. An exemplary power supply according to the present disclosure can be constructed to be capable of providing long hold-on times for combating drop-outs in the mains supply, and doing so with capacitors significantly less voluminous, less costly and with greater reliability than prior art power supplies of similar rating. This advantage arises from the significantly greater percentage of utilization of the power stored in the capacitors, than is generally possible in prior art power supplies.

The exemplary implementation of the power supply of the present disclosure shown in FIG. 3, differs from the prior art power supply described in FIG. 1 in that it incorporates two PWM supplies in series, a first PWM supply 32 feeding the second PWM supply 33. The first supply PWM1 is constructed as a DC/DC unit to output a comparatively poorly regulated voltage, which can be a number of times higher than the desired output voltage. PWM2, constructed as a DC/DC converter, then takes this output and generates a well regulated output at the desired voltage. This arrangement provides a number of advantages which are cumulatively operative to enable the achievement of most of if not all of the aims described hereinabove.

Firstly, the power supply of FIG. 3 does not require use of a reservoir/smoothing capacitor at the rectifier output. For the 5 volt, 5 Watt exemplary power supply of the present disclosure, the "reservoir capacitor" 30 used at the diode bridge output (or the "reservoir" and "smoothing" capacitors) is preferably only of the order of 0.1 $\mu$F, which is a small fraction of the typically 10 $\mu$F value reservoir capacitor used in the prior art supply shown in FIG. 1. The capacitor of the present supply fulfils a completely different function from the reservoir capacitor of the prior art supply, where its function is to smooth the bridge output as much as possible, commensurate with an acceptable capacitor size. In contrast, the capacitor or capacitors shown at the input to PWM1 in FIG. 3, function, together with a suitable inductor or inductors 31, as the mandatory RFI filter assembly for preventing radiation being sent back to the AC mains. Because of their location at the entrance to the PWM1, they are nevertheless called hereinwithin, the "input capacitor" or "input capacitors".

Because of the small value of the input capacitor used in the exemplary power supply of FIG. 3, there is virtually no top-up inrush current at each half cycle, such that the current limiter 16 of FIG. 1 can be eliminated, thus saving the wasted energy dissipated in this component. The 0.1 $\mu$F input capacitors used are substantially smaller in physical size than the capacitors used in prior art supplies. Besides the physical size advantage, such a low capacitance value makes it practical to use ceramic capacitors rather than the electrolytic capacitors which would be needed in prior art supplies using smoothing capacitors of the order of several $\mu$F or more. Ceramic capacitors have lower leakage and a better overall high frequency performance than electrolytic capacitors, such that their use is generally beneficial, especially in an RFI filter assembly, and performance is improved.

Figure 4A:
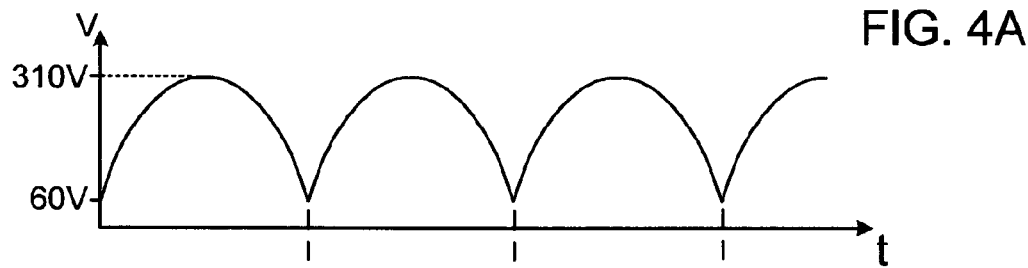
FIG. 4A shows a graph of the bridge output voltage for the power supply of FIG. 3.

However, as a result of using such a small input capacitor, the level of ripple in the rectifier assembly output is substantially larger than that of prior art supplies. FIG. 4A shows a graph of the rectifier assembly output voltage for the exemplary power supply of FIG. 3, from which it is seen that since the input capacitor is so small, it almost completely empties between peaks, and does not behave as an effective reservoir capacitor. If no input capacitor at all were used (in those situations where an RFI filter is not needed), the bridge output voltage would indeed go down to zero at each half cycle, every time that the AC waveform makes a zero-crossing. The power supply of the present invention can thus be characterized in that the first switched mode power supply module PWM1, draws current from the rectifier assembly during the majority, if not all of the AC cycle.

Figure 4B:
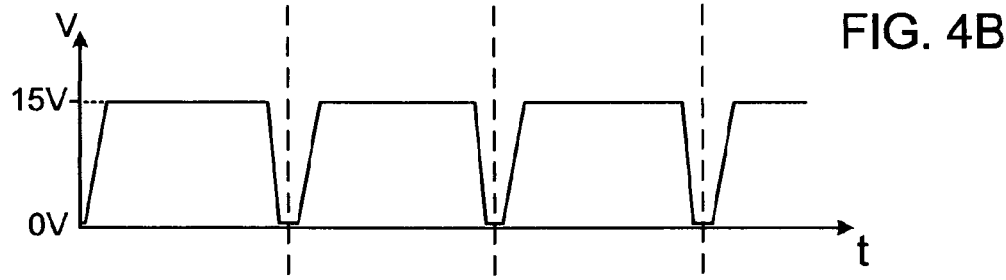
FIG. 4B shows a graph of the output voltage of the first switched mode power supply of the embodiment of FIG. 3, without an output capacitor.
Figure 4C:
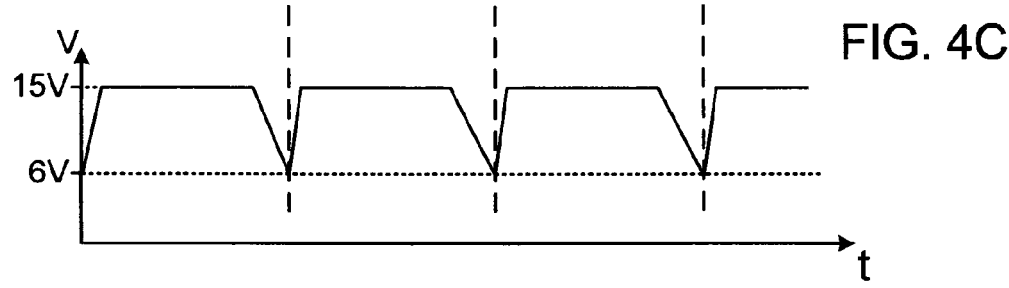
FIG. 4C shows the effect on the graph of FIG. 4B by the addition of an output capacitor to the first switched mode power supply.

As a result of the small input capacitor(s), the output voltage of the bridge will vary from a minimum of the order of a few tens of volts or less, up to the peak output voltage of the unsmoothed rectifier assembly. In the example shown in FIG. 3, this is seen to be from about 60 volts to a peak of 360 volts for a 250 volt AC wall supply, i.e. a range of some 300 volts or more. For the example shown in FIG. 3, PWM1 is constructed to provide a DC output rated voltage of 15 volts. However, because of the small input capacitor 30, the output voltage of PWM1 would also have a large ripple, falling substantially from the output voltage during that part of each half-cycle around the AC zero-crossing, as shown in FIG. 4B. In order to overcome this drop, which may degrade the operation of the device being powered, a capacitor 35 is added at the output of PWM1, which then fills in the dips in the output characteristic shown in FIG. 4B, such that the output shown in FIG. 4C is obtained, with a more moderate ripple. This output capacitor 35 of PWM1 can thus be considered to act as the reservoir capacitor of the rectifier assembly, located not in the conventional position at the rectifier output, but rather after the first switched mode power supply module PWM1. The minimum ripple level is dependent on the size of the capacitor 35 used. If capacitor 35 were sufficiently large, of the order of a few thousand μF, perhaps up to 4,000 μF for the exemplary power supply discussed, it would be possible to obtain a stable DC output, with a very small ripple of the order of 50 mV, which is an acceptable level for use with mobile devices. If such a large capacitor were used, there would be no need for PWM2 in order to fulfill the requirements of a stable output. A capacitor of this size for operation at a comparatively low voltage is still substantially smaller than a capacitor of the order of 10 μF for operation at the 350 volt peak output of the diode bridge. Thus, even this example using only one PWM with the reservoir capacitor effectively moved from the input to the output of the PWM would enable a reduction in the size of the power supply, compared with a similar rated prior art power supply of the type shown in FIG. 1.

However, in order to improve the characteristics of the power supply of the present invention even more, reference is again made back to FIG. 3, where it is seen that the output at capacitor 35 is input to a second PWM 33, where a stage of DC/DC conversion is performed, this time down to the desired output voltage of 5 volts. Because this PWM is able to provide good regulation using the DC output of PWM1 as its input, it is therefore possible to reduce the value of capacitor 35, by one to two orders of magnitude, typically to the order of 100 μF for the 15 volt, 5 Watt exemplary output. The output from PWM1 then has a ripple level of from 15 volts falling typically even as far as to 6 volts. Such a wide input voltage range can however be readily handled by the PWM2 supply. At the output of PWM2, a small capacitor 37 is used as an output filter, and to provide the sampling point for the low voltage detector described hereinbelow in relation to the standby mode of PWM2. An immediate advantage of this preferred embodiment is that the size of the typically 100 μF, 16V rated capacitor at the output of PWM1, being of the order of 7 mm in diameter×4 mm high, is significantly smaller than a typical 4,000 μF, 5 V rated capacitor, which would be necessary if only one PWM were to be used. This in itself provides the described power supply with a substantial marketing advantage over the prior art type of power supply of FIG. 1, besides the concomitant savings in cost and resource use.

An additional advantage arises from the higher energy utilization rate of the smaller capacitor 35 of the present embodiment. The energy, E, stored in a capacitor is given by the expression $E=V^2C/2$, where V is the voltage on the capacitor C. In prior art power supplies using a large reservoir/smoothing capacitor, the energy stored is high, since the value of C is high, but since the ripple level has to be kept so small, only a very small part of that stored energy is utilized by the power supply to provide output during that part of the cycle when the input voltage from the rectifier bridge is below the capacitor voltage. The utilized energy $\Delta E$ is given by the expression:

$$\Delta E=(V_1^2-V_2^2)C/2,$$

The ratio of actual to maximum theoretical energy utilization is given by:

$$R_E=(V_1^2-V_2^2)/V_1^2$$

where $V_1$ and $V_2$ are the peak and minimum voltages on the capacitor. Since the ripple $V_1$-$V_2$ in prior art supplies is so small, the fraction of utilized energy is also small. According to the various examples of the power supplies of the present application, with their large allowed ripple voltages, the utilized energy of the capacitor is considerably larger, since the difference between $V_1$ and $V_2$ is much larger. Consequently, the fraction of energy utilization of the capacitor 35 is considerably higher, with the majority of the stored energy being utilized to fill up the dips in the output of PWM1.

However, the additional cost of an extra PWM module in a power supply is significantly more than the reduction in cost of the power supply due to the reduced size of the capacitor C 35. This additional cost is offset in the presently described power supplies by the existence of additional benefits obtained by the use of the second PWM 33, as follows.

The power supply now comprises two separate converter modules, with the regulation of the output voltage, and the current regulation being performed in PWM2. PWM1 effectively acts only as a buffer DC power source, providing a roughly regulated 15 volt DC input to PWM2, with a ripple level allowing the voltage to drop down to 6 volts. This division in itself provides better overall efficiency as compared with a single stage power supply because of the intrinsic differences between an AC/DC switched mode power supply with a large input/output voltage ratio, such as is used in prior art supplies, and PWM2 which is a DC/DC switched mode power supply, with a small input/output voltage ratio. An AC/DC switched mode power supply circuit having a high voltage mains input, generally has to have a topology which physically separates the input from the output sides, and the circuits must therefore be floating without any common ground. The constraints imposed by this topology limit the achievable efficiency of such power supplies. Additionally, the input/output voltage ratio is very large, from 360 V AC peak down to a highly regulated 5 V DC output, which may also be difficult to achieve with high efficiency. A DC/DC converter such as PWM2, on the other hand, has a much simpler circuit topology, with a common ground construction, and a small input/output voltage ratio, and is thus able to achieve very high efficiencies, as further expounded hereinbelow. Though PWM1 also functions as an AC/DC supply, when the input AC rectifier is included into its functionality, and thus has a floating configuration to provide isolation between input and output, its conditions of operation are significantly relaxed, since the output regulation required is less important, and the input/output voltage ratio is lower than that of prior art single unit supplies. Because of the significant reduction in the level of regulation required for PWM1, the feedback circuits of PWM1 can be simpler than those of prior art supplies, thereby further saving component cost.

Figure 5:
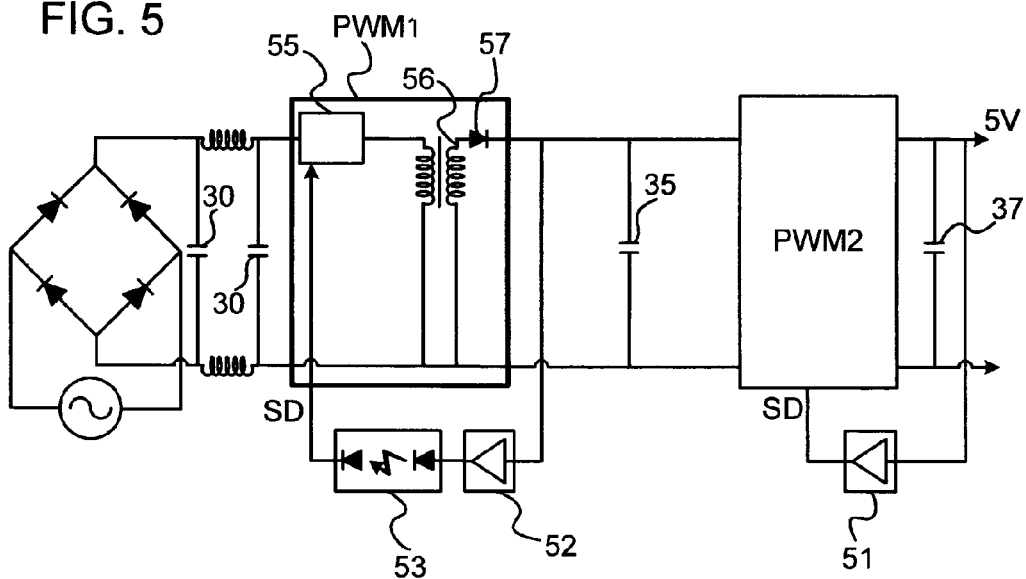
FIG. 5 illustrates schematically how the double-stage power supply of the embodiment of FIG. 3 can be operated such that the stand-by current is substantially reduced, using a double burst configuration.

There are also more specific reasons for the increase in efficiency engendered by the use of two serial PWM units. Within each PWM, as shown in FIG. 5 below, there is generally an input switching and control circuit 55, a high frequency transformer 56, and a diode rectifier 57. There is generally a drop of approximately 0.6V across the diode rectifier. According to the prior art example of FIG. 1, with its PWM unit delivering a 5 volt output, the 0.6 V drop across the diode represents about 12% of the 5 volt output voltage. On the other hand, in the embodiment of the present invention shown in FIG. 3, the 0.6 volt diode drop represents only about 4% of the 15 volt output of PWM1, such that the power loss in the PWM unit is decreased by a factor of 3. Expressing this comparison in terms of absolute losses, in a prior art 5 Volt, 5 watt single PWM power supply, the rated current of 1 ampere will dissipate 600 mW across the diode, whereas in a 15 Volt power supply of the same 5 watt rating, using the double converter architecture described herewithin, the 330 mA current will dissipate only 200 mW across the diode, thereby increasing the first PWM unit's efficiency. The combination of this outcome of the lower current output of PWM1, together with the power saved because of the obviation of the need for an inrush current limiter, enables the achievement of an efficiency of 90% for PWM1. An additional advantage in the use of a higher DC output from PWM1 is that the parasitic reluctance of the high frequency transformer 56 is reduced, as the secondary voltage is some three times larger than if the 5 Volt output were to be provided directly in one PWM supply. This saves components for neutralizing the effects of this parasite reluctance, which too is advantageous in improving overall efficiency.

Furthermore, since PWM2 now operates at low voltages only, it can be constructed using synchronized rectifier MOSFET's instead of simple diode rectification, thereby increasing the rectification efficiency, such that an efficiency of up to 95% is achievable. If, because of its lower current rating, an efficiency of 90% can be achieved for PWM1, then the overall efficiency of the novel power supply designs of this disclosure will be 90%×95%=85% approximately. The use of this double PWM design thus enables the efficiency of the power supply to be substantially increased.

Additionally, the use of a small input capacitor for PWM1 is also operative in improving the power factor of the power supply. In prior art supplies, where the size of the reservoir capacitor is such that the diode bridge only needs to top the capacitor up by a small amount, such as from 300 to 360 Volts, this pulse of input current drawn over a short portion of the cycle degrades the power factor of the device. The small input capacitor allows the PWM1 output to drop substantially, from 15 V down to 6 V in the exemplary power supplies of the present invention. In order to refill the input capacitor, the supply draws current from the AC mains over a much longer part of the AC cycle (and if no capacitor were used, over essentially all of the AC cycle), thus using less current over a longer time period, such that the power factor is improved in comparison with prior art supplies.

Since many such supplies, especially those for mobile telephone use, spend much of their time in a stand-by state, the reduction in power losses during use, though itself advantageous to the environment, is generally small compared with the environmental advantages arising from any reduction which can be achieved in the stand-by current drawn by the supply. In prior art supplies, such as that shown in FIG. 1, the optimum stand-by state is generally obtained by ensuring that there is very little leakage from the output capacitor 18 and its drive circuits, such that virtually no current need be delivered by the PWM. However, the PWM supply is still active, and although it is delivering virtually no current, its switching FET's and other control devices are constantly in operation regulating the output voltage, even if virtually no current is being drawn. It is these control functions which make up the typically 300 mW dissipation of such prior art supplies when sleeping.

Reference is now made to FIG. 5, which illustrate schematically how the double-stage power supply of the type shown in FIG. 3 can be operated such that the stand-by current is substantially reduced, preferably by up to one order of magnitude, compared with prior art supplies. The system operates by what could be termed a "double burst" configuration. The supply operates by shutting down both of the PWM's completely when no load conditions are detected, such that no control power is used in the PWM's. The supply differs from that shown in FIG. 3 by the addition of low voltage detectors (LVD's) 51, 52 for monitoring the output voltage of each PWM stage. Each LVD generally comprises a comparator with an internal precision voltage reference. Each LVD is operative to shut down its PWM when the output voltage is such that no-load conditions are indicated, until generation of the next burst.

Looking first at PWM1 to illustrate the overall operation of the awakening mode of the power supply, when the PWM1 is in standby mode, it is completely shut down, and a control function must instruct it to awaken when required. This is the function of the LVD 52 whose operation will be described below. Component 53 is an optocoupler to provide isolation of the output from the mains voltage at the input to the power supply. An alternative method of providing this isolation is shown in the exemplary power supply described in FIG. 10 hereinbelow. The signal to awaken is determined by monitoring the voltage on the PWM1 output capacitor 35. The moment the control components in LVD 52 detect the fall in voltage on capacitor 35 caused by the load on the power supply, they instruct the switching circuit 55 in PWM1 to begin operation, and PWM1 supplies current to replenish capacitor 35, and to power the load requirements.

Figure 6:
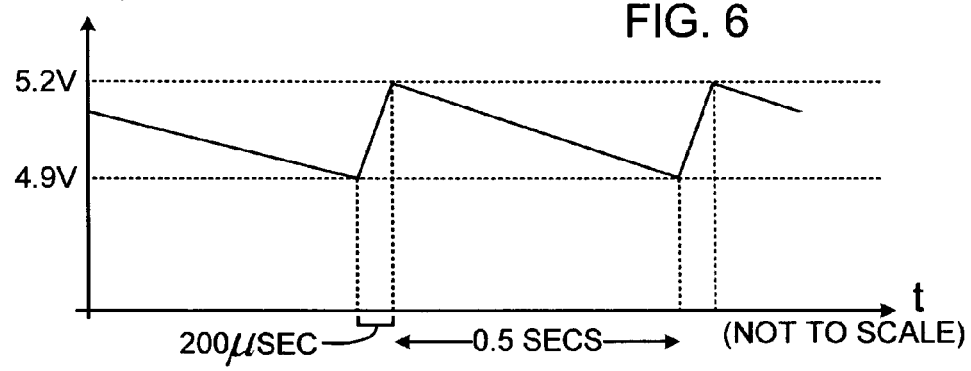
FIG. 6 is a schematic graph of the output voltage of the first switched mode power supply unit of the embodiment of FIG. 5 using a double burst configuration.

Reference is now made to PWM2, with its nominal regulated output of 5 volts. The regulation characteristic of the output of PWM2 is designed such that when no load is present, or when the current drawn is very low, the output voltage is allowed to rise very slightly, to perhaps 5.2 volts. The low voltage detector 51 may be such that when its input voltage reaches 5.2 volts, it outputs a signal which shuts down PWM2 completely, disconnecting its supply voltages such that PWM2 draws essentially no current whatsoever. The LVD itself draws a very low current, typically of the order of 1 microampere, such that its consumption is negligible. The LVD is selected such that when its input voltage is slightly less than the nominal 5 volt output of PWM2, such as 4.9 volts, the LVD switches the PWM2 on again, such that it again raises the output voltage in a burst of operation. Under no-load conditions, it may take the PWM2 supply of the order of 200 μsec. to raise the voltage back to 5.2 V, when the LVD will again switch off the PWM2. So long as there is no load on the supply, the output voltage drops very slowly due only to leakage, and may take of the order of a half second to drop from 5.2 V to 4.9 V. The duty cycle of the PWM supply is thus of the order of $200 \times 10^{-6}/0.5$, i.e. only 0.02%. The burst itself is performed at a high current, such that its efficiency, even for the short period it is on, is high. The output voltage of PWM2 is shown schematically in FIG. 6, where the effect of the burst operation is shown raising the output voltage back to 5.2 volts. It is understood that if there is a load on the output of the power supply, the current drawn will prevent the output voltage from reaching 5.2 V, and the PWM will stay switched on supplying current to the load in its normal current controlled mode, according to the load requirement. The total current consumption in sleep mode for the PWM2, from its input capacitor 35 to its output capacitor 37 may thus be of the order of only 10 µA.

Figure 7:
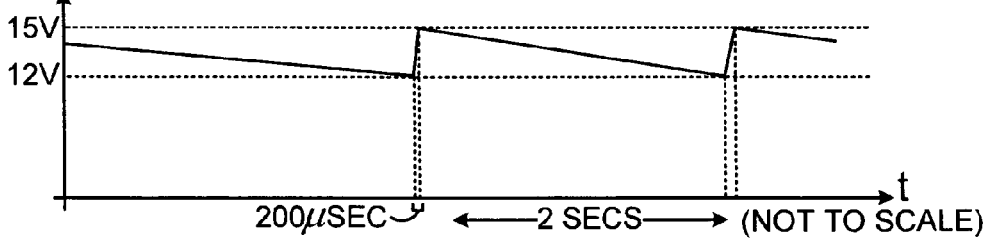
FIG. 7 is a schematic graph of the output voltage of the second switched mode power supply unit of the embodiment of FIG. 5 using a double burst configuration.

PWM1 also operates in a burst mode configuration. LVD 52, with an optocoupler 53 for isolation, monitors the output of PWM1, and is designed to shut down PWM1 when its output voltage reaches 15 V in this chosen example. During no-load conditions, the output voltage falls due to leakage across components, and the LVD 52 circuit is selected, typically to switch on the PWM1 again when the voltage drops to a lower level, which could be approximately 12 V, and to recharge the capacitor 35 to its nominal voltage of 15 V. As with PWM2, this recharging burst-operation time may also be of the order of 200 µsecs. Rather than letting the voltage decay down to 6 volts, as described in FIG. 4C, a comparatively high turn-on voltage, such as 12 V is used. This is done so that when a load current is demanded during shut-down conditions, regardless of the point of time in the graph of FIG. 7 at which the load is applied, there should be sufficient energy in the capacitor 35 to commence immediate current supply. If the voltage on capacitor 35 were allowed to drop down to 6 volts, and current were demanded at that point in time, PWM2 would not be able to instantly supply the desired output regulated voltage from the stored energy in the capacitor 35. Limiting the minimum voltage drop to a comparatively high voltage such as 12 V, ensures a rapid response to the application of a load.

With a capacitor 35 of the order of 150 µF, the stored energy is such that the decay in voltage on the capacitor allows several seconds to elapse before the need for another burst. This long interval, engendered also by the large differential switch-on/switch-off voltage range, means that the overall current drawn by PWM1 in its sleeping-mode is very low. The result is that the overall sleep-mode consumption is determined primarily by the length of time the PWM1 is off, since the burst operation duty cycle is so short. The output voltage of PWM1 is shown schematically in FIG. 7, where the effect of the burst operation is shown raising the output voltage back to 15 volts once it has dropped below 12 volts.

It is known that in general, when a power supply works at well below its rated output, its efficiency generally falls, since the quiescent currents used by the various circuit elements exist regardless of the current output they are supplying. The architecture of the various power supply examples of the present disclosure is such that even when working at low output levels, the power supply continues to operate at a good efficiency. This can be achieved by arranging that the double burst operation is operative not only in the standby mode, when there is essentially no current supplied, but also at low powers, where the current supplied is low. This is achieved by "tailoring" the regulation of the power supply. Under normal, high current working conditions, the power supply control ensures that the current demands of the attached load are fulfilled, thus maintaining the stability of the output voltage. As the load decreases, the current which needs to be supplied to the load by the power supply also falls.

According to this mode of power supply operation, the minimum current which can be supplied by the PWM is limited at some predetermined level, below which the current output cannot fall. Now, as the load continues to decrease, the current cannot fall below that predetermined level, and the excess current not demanded by the load causes the voltage to rise. As soon as this voltage increase is detected by the LVD associated with that PWM supply, the PWM is shut down, thus entering a quasi-standby situation. However, unlike the true standby situation, where essentially no current is being drawn from the supply, in this case, there is nevertheless a low current being drawn, and this current quickly pulls the output voltage of the PWM supply down again, thus reactivating the power supply, and exiting the quasi-standby situation. The power supply thus switches in and out of its burst operation mode at low currents. This mode of operation, which is essentially a high repetition rate burst mode of operation, ensures that even when supplying a low current, the efficiency is maintained at an acceptable level, since the supply is either on at a significant current level, with a good efficiency, or it is off, in which case there is no current supply. In this situation, the burst operation essentially occurs at a much higher rate than during a true standby situation, where only current leakage ultimately causes the PWM supply to provide a burst of current.

In summary, this exemplary power supply can thus operate in a number of different modes:

1. Stand-by or sleep mode, when the converters are both asleep, and the voltage on the storage capacitor or capacitors is monitored to detect when to arouse the PWM1 to provide a burst of current to top up the capacitor(s). The burst of town is generally supplied at the converter's full rated level, to maintain good operating efficiency.
2. Normal operation, with a medium or high current low, during which the current control of the PWM1 ensures that the output current matches the load requirement by monitoring at least one of the current and output voltage. No burst mode operation is used here.
3. Low current mode, when the power supply operates in a burst mode type of operation, providing full level burst of current to match the load requirements, thereby ensuring that good efficiency is maintained. If the current demand falls, then the bursts become less frequent, but the current level within each burst is not reduced.

Control of these different modes is exercised by monitoring of the voltage on the storage capacitor(s) at the outputs of the two converters, PWM1 and PWM2.

Logic circuits are required by PWM 1, in order to ensure that, on the one hand, the circuit is ready for operation at any moment, allowing not more than a fraction of a millisecond before supply is provided, and on the other hand, that the circuit should be essentially completely asleep when not in use.

However, when the supply is off, and is first turned on, there is no voltage at all available for the optocoupler, to enable PWM1 to switch itself on. Therefore, logic circuitry must be provided in order to ensure that there will be voltage available to the optocoupler for proper switch-on of PWM1, so that the power supply is ready for operation at any time. The optocoupler cannot be allowed to draw current while in the sleep mode, since that would degrade the performance of the low-current sleep mode. The optocoupler thus only operates when current is being drawn, and is off when no current is drawn.

Figure 8A:
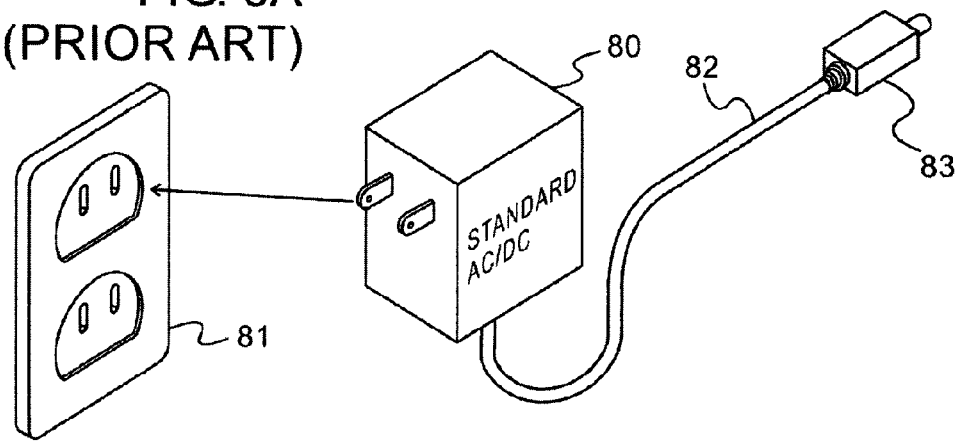
FIGS. 8 to 8D illustrate schematically how the double stage power supply described in FIG. 3 or 5 enables use of a much finer and/or a much longer supply wire from a wall socket AC/DC power supply to the load device it is powering.
Figure 8B:
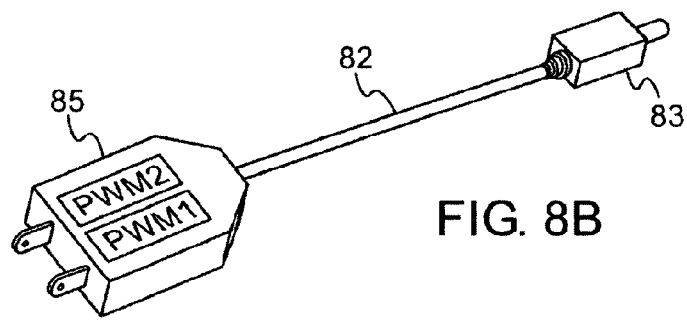

Reference is now made to FIGS. 8A to 8D which illustrate how the double power supply topography using two serial power supply modules described hereinabove, can be used advantageously to provide a wall socket power supply for powering a load device, having a smaller cross-section connecting cord than that of prior art power supplies. FIG. 8A illustrates such a prior art AC/DC power supply 80, for plugging into a wall socket 81, with the low voltage cord 82 connecting the output of the power supply to the plug 83 for plugging into the load device (not shown). FIG. 8B now shows the mechanical appearance of an exemplary power supply 85 constructed according to the circuit topographies shown in FIGS. 3 and 5 above, and incorporating two pulse width modulation power supply modules, marked PWM1 and PWM2. The cord 82 connecting this power supply 85 to the load device plug 83, is similar to that used in prior art designs as shown in FIG. 8A.

Figure 8C:
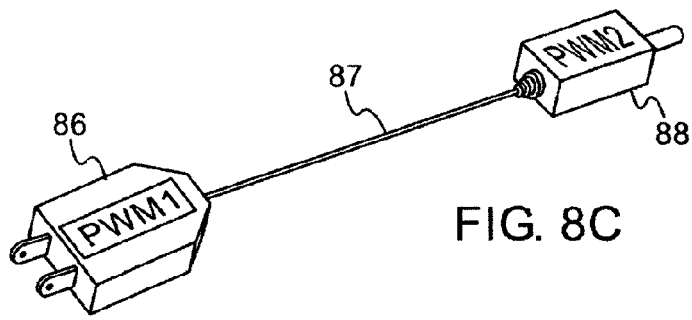

Reference is now made to FIG. 8C, which illustrates schematically a further advantageous configuration of the power supplies described in this disclosure, in which the two power supply modules are physically separated. The first power supply module 86, marked PWM1, is incorporated into the plug for plugging into the AC wall socket 81. The second power supply module 88, marked PWM2, is incorporated into the plug for connecting to the load device. The cord 87 connecting the first power supply module 86 at the wall plug with the second power supply module 88 plugged into the load device, carries a current at a higher voltage, typically 15 V, than the voltage required by the load device, typically of the order of 5 per. Therefore the current in this cord will be lower, typically three times lower, than that of the connecting cord 82 of the prior art design shown in FIG. 8A, and of the novel power supply design shown in FIG. 8B where both of the power supply modules are incorporated into the wall plug 85. The connecting cord 87 of the split power supply module configuration shown in FIG. 8C can therefore be of thinner cross-section than that of prior art FIG. 8A and of FIG. 8B.

This split power supply module configuration has a number of advantages:

(i) The lower current flowing from the wall plug 86 to the device plug 88 means that there is less resistive dissipation in the connecting cord 87 than with prior art power supplies. This can be implemented either in terms of the use of finer and hence more flexible wire, or in the increased efficiency obtained using the same cross-section wire. Even if thinner wire is used, and there are losses and a voltage drop along the cord, such a voltage drop can be compensated for in the second power supply module PWM2.

(ii) Both of the power supply modules can be constructed having small physical dimensions. The first power supply module PWM1, because of the elimination of the large smoothing capacitor generally used in prior art designs, can be made sufficiently small that it fits into the plug not much larger than a standard wall plug. Similarly the second power supply module PWM2, being a DC/DC converter, can be made sufficiently small that it fits into a plug not much larger physically than a standard plug for connecting to the load device.

Figure 8D:
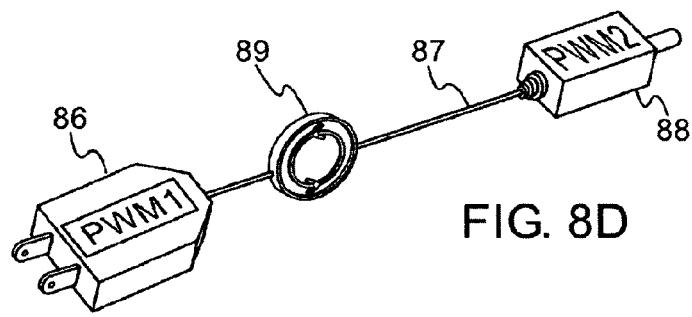

(iii) If a thinner connecting cord 87 is used, it will take up less volume than prior art connecting cords, and, as shown in FIG. 8D, can be conveniently stored in a retractable reel 89, so that it is neatly hidden when not deployed in use. The reel 89 could be incorporated within the wall plug 86 itself, making for a particularly compact arrangement.

Figure 9:
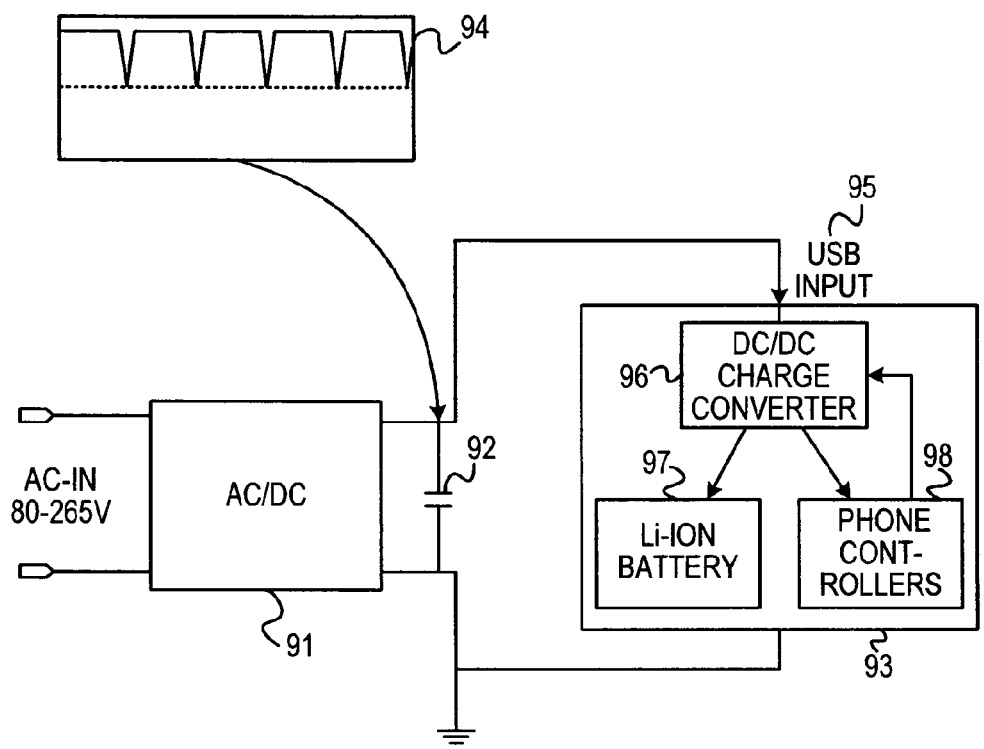
FIG. 9 illustrates schematically an additional application of the split power supply described in FIGS. 8A-8D, which can be advantageously used with portable devices such as cellular phones.

Reference is now made to FIG. 9, which illustrates schematically an additional application of the split power supply described in FIGS. 8A-8D, which can be advantageously used with portable devices such as cellular phones 93 having a USB input 95 for powering the device or for charging its internal battery. The wall plug unit 91, which is equivalent to wall plug unit 86 of FIGS. 8A-8D, is adapted to be plugged into an AC mains power supply, shown in this example to be between 80 and 265 V. It contains the rectifier bridge and DC/DC converter, shown in the previous drawings as PWM1, and the output reservoir/smoothing capacitor 92. This capacitor may be either a comparatively small electrolytic, or a tantalum capacitor or even a ceramic capacitor, its comparatively low capacitance value being allowed because of the high ripple level tolerated at the output of the converter. A plot of this output is shown in the graph 94, similar to that shown in FIG. 4C.

The output cord from the wall plug unit 91 is adapted to be plugged into the USB input of the mobile phone 93. This input port feeds a DC/DC converter 96, implemented by the PWM2 power supply unit of the previous figures in this application. The output from this DC/DC converter may be used either for charging the device's internal battery 97 or for powering the phone itself with its controllers 98. Functions would then be performed with the low ripple levels output from the DC/DC converter 96. This converter also provides the correct charging current characteristics for charging the LI-ion internal battery of the phone.

For such a cellular phone application, the output of the wall plug unit could be up to 9 V, falling to 5 V during the zero crossings of the DC input voltage. Such an output would be suitable for inputting to the USB input socket of a cellular phone, which can typically accept a DC input of from 4.4V, the lower limit permitted for a USB supply, and up to 10 V. This implementation thus enables provision of a wall adapter for charging a cellular phone having a USB input, the wall adapter being lightweight, high-efficiency and small dimensioned, along with other advantages of the power supply architecture described hereinabove in this disclosure.

In the power supplies of the present disclosure, as illustrated in FIG. 5, when the PWM1 is in standby mode, it is completely shut down, and a control function must instruct it to awaken when required, as determined by the level of the voltage on the output capacitor 35 of PWM1. The moment a fall in voltage on capacitor 35 is detected, such as when a load is applied to the power supply, the switching circuit 55 in PWM1 is instructed to begin operation, and PWM1 supplies current to replenish capacitor 35, and to power the load requirements. The power supply of FIG. 5 has been described up to now using an optocoupler 53 in order to isolate the low voltage power supply output of the DC/DC converter, with which the user can come into contact, from the mains voltage which is present at the input to the AC/DC converter at points where the AC/DC converter is controlled. Such an optocoupler is also shown in the prior art power supply of FIG. 1.

Figure 10:
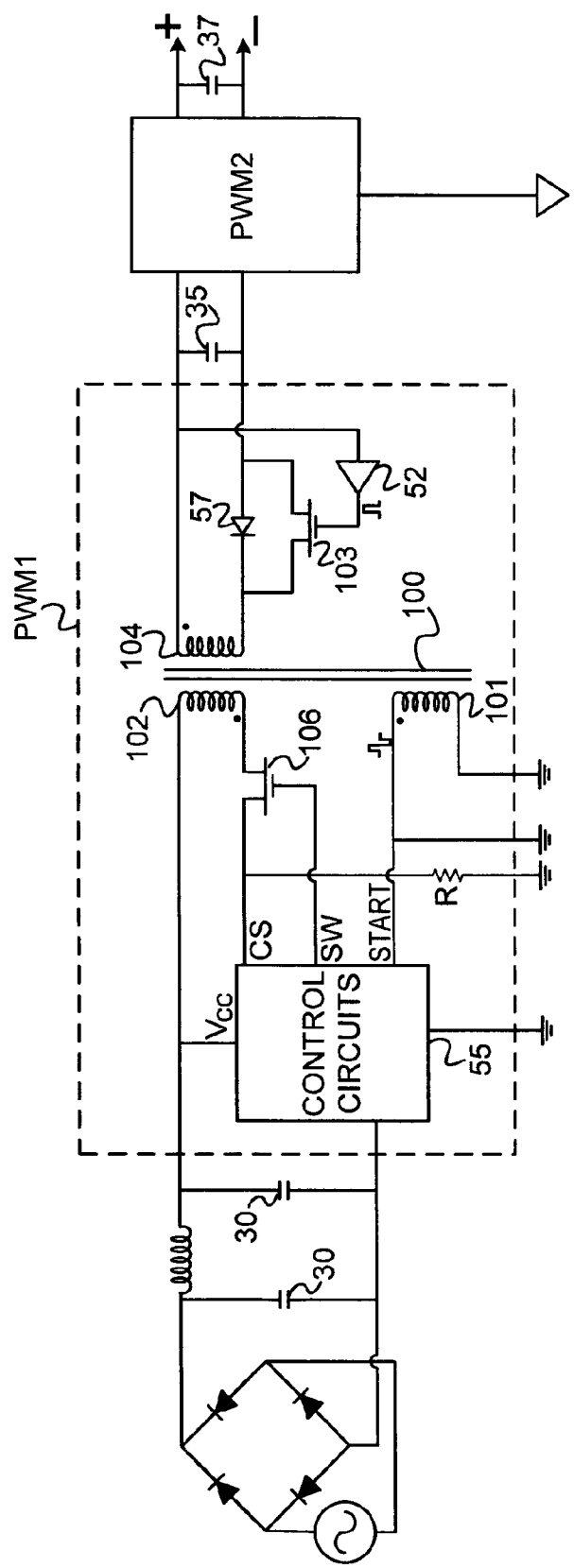
FIG. 10 is a schematic circuit diagram of an optocoupler-less implementation of the double-stage power supply of FIG. 5.

However an optocoupler is a comparatively expensive component, and uses valuable real estate on the circuit board. Reference is thus now made to FIG. 10, which illustrates a further exemplary power supply, in which the control feedback to the AC/DC converter is achieved without the need to use an optocoupler. Use is made of the main transformer of the pulse width modulation supply PWM1 in order to provide feedback from the voltage on the output capacitor back to the PWM supply control in order to start PWM1 when there is need to wake it from its sleep mode. While PWM1 is in its sleep mode, the high frequency transformer is unused, and thus is free to perform this function.

In FIG. 10, separate functional components of the converter PWM1 are shown in order to illustrate the operation of this particular implementation. In common with the power supply shown in FIG. 5, the power supply of FIG. 10 comprises two serial DC/DC voltage converters—PWM1 and PWM2. Converter PWM1 differs from prior art pulse width modulation power supplies in that the high frequency transformer 100 has an additional primary winding 101, in addition to that of the main primary winding 102. It is this additional winding that is used to transmit a control signal for arousing the first converter PWM1 from its sleep mode, while still providing isolation between the first converter PWM1, which is directly connected to the mains input voltage and the output stages. This additional winding thus fulfills the function of the optocoupler of the previous exemplary power supplies, and of prior art power supplies also.

This implementation operates in the following manner. As in the previously described implementations, the voltage on the output capacitor 35 is monitored by a control component 52. The moment the control component 52 detects that the voltage on the output capacitor has fallen by the predetermined amount and that there is need to flow current into the capacitor 35, either in order just to top up leakage from it, or in order to start supplying power to a load which has been connected to the output, the first converter PWM 1 has to be aroused in order to flow this current. The control component 52 does this by first supplying a pulse to the gate of the FET 103 connected across the rectifier diode 57. The FET is closed momentarily and connects the secondary winding 104 of the transformer to the capacitor 35, providing a pulse of current in the secondary. This induces an equivalent current pulse in the additional control winding 101 on the primary of the transformer. This pulse is formed and applied to the feedback input START of the control circuits 55 of PWM1, which uses this signal in order to arouse PWM1 from its sleep mode. Additional logic circuits, not shown in FIG. 10, are required in order to enable this start up signal to be detected even when the control circuitry of PWM 1 is in standby mode. When aroused, the PWM1 control circuitry 55 outputs a control pulse from output SW to turn on the MOSFET 106 so that a burst of current can be flowed through the primary winding 102, to replenish the capacitor 35. During regular normal power output operation, the MOSFET 106 is used to control the current through the primary 102 using the current sense input CS to the control circuitry 55, which monitors the primary current flowing through the resistor R. In addition, during regular normal power output operation, the START input can be used to sample the voltage on capacitor 35, for use in control functions.

This implementation operates in the following manner. As in the previously described implementations, the voltage on the output capacitor 35 is monitored by a control component 52. The moment the control component 52 detects that the voltage on the output capacitor has fallen by the predetermined amount and that there is need to flow current into the capacitor 35, either in order just to top up leakage from it, or in order to start supplying power to a load which has been connected to the output, the first converter PWM1 has to be aroused in order to flow this current. The control component 52 does this by first supplying a pulse to the gate of the FET 103 connected across the rectifier diode 57. The FET is closed momentarily and connects the secondary winding 104 of the transformer to the capacitor 35, providing a pulse of current in the secondary. This induces an equivalent current pulse in the additional control winding 101 on the primary of the transformer. This pulse is formed and applied to the feedback input FB of the control circuits 55 of PWM1, which uses this signal in order to arouse PWM1 from its sleep mode. Additional logic circuits, not shown in FIG. 10, are required in order to enable this start up signal to be detected even when the control circuitry of PWM1 is in standby mode. When aroused, the PWM1 control circuitry 55 outputs a control pulse from output SW to turn on the MOSFET 106 so that a burst of current can be flowed through the primary winding 102, to replenish the capacitor 35. During regular normal power output operation, the MOSFET 106 is used to control the current through the primary 102 using the current sense input CS to the control circuitry 55, which monitors the primary current flowing through the resistor R. In addition, during regular normal power output operation, the FB input can be used to sample the voltage on capacitor 35, for use in control functions.

This arrangement has two advantages. Firstly isolation is provided by the transformer 100, without the need for an optocoupler. Secondly, the same FET switch 103 used to provide the current pulse to the secondary 104 of the transformer, can also be used in order to perform synchronized rectification of the transformer output current. The voltage drop across the FET when switched on can be as low as 20 mV, as compared with the 0.6V drop across the forward biased diode 57. Use of synchronized rectification thus saves almost all of the power dissipation across the rectifier diode 57, and substantially increases the efficiency also of PWM1, in a similar manner to that described in FIG. 5 in relation to PWM2.

In FIG. 10, the bounds of the first converter, PWM1 shown by the dotted boundary line, have been drawn to include also the output capacitor voltage monitoring circuitry 52 and the MOSFET 103 and rectified diode 57. It is to be understood that inclusion or exclusion of components as part of PWM1 is an arbitrary decision, and is not meant to limit this implementation in any way.

In FIG. 10, the control input is applied only to PWM1, independently of the source of the control signal. Consequently, although FIG. 10 illustrates the use of this additional primary winding to provide isolated control input functionality to the power supplies of the type described in this application using two serial voltage converters, it is to be understood that this concept has wider application in prior art pulse width modulation power supplies, comprising a single PWM unit, and it is not to be understood that this novel implementation is intended to be limited to the double converter topology described hereinabove. The particularly advantageous use of this aspect of isolated transformer winding control has been described in its use when the power supply is in a sleep mode and the control signal is used to arouse it, such as in a burst mode type of configuration. However it is possible that the additional winding can be used to supply isolated control function signals even when the system is operating normally, such as by using modulation frequencies removed from the switched mode frequency of the power supply.

There is an increasing requirement today that power supplies used for powering critical devices, generally those other than battery driven devices, should have significant hold-up times. The hold-up time of the power supply is defined as the period during which the input mains power can drop out, while the power supply still outputs a current sufficient to drive the device for which it is designed. For use in developed countries, a hold-up time of the order of 10 or 20 msec. is generally required, i.e. half of a complete cycle, or a complete cycle of the AC mains. In less developed regions, where the electricity supply is less reliable, hold-up times of two or three cycles are common requirements, i.e. up to 60 msec. Such lengthy hold-up times are achieved in prior art power supplies by the use storage capacitors, much larger than which would otherwise be required for reservoir/smoothing functionality, and they use ensure that the power supply can deliver its output from the storage capacitor while the mains input is missing.

However, providing a lengthy hold-up time in a prior art power supply, having its storage capacitors at the output of the rectifier bridge, imparts very rigorous requirements on the capacitors used for this function. Such capacitors must be voltage rated at the highest peak voltage expected when the mains power is at its maximum possible level, and at the same time must be of such a capacity that they can continue to supply the rated output of the power supply even if the mains power cuts off at a point in time when the voltage is at its minimum possible level. For example, consider a conventional power supply for use with a nominal 220 V AC mains supply. The range of voltages over which the power supply must operate correctly is from 180V to 260 V. In order to withstand the maximum peak voltage expected, the capacitor must be rated at 400V. But in order to have sufficient storage to continue operation during voltage dropouts, the capacity must be such as to provide input current during the hold-up period when charged to a voltage of only 180V. These two parameters therefore dictate high capacity and high working voltage for the capacitors used. The situation with a universal power supply operating from 85 V to 264 V is even more serious. Because of the excess capacity required to continue operation at the lower end of the voltage input range, when used at the nominal input voltage, such capacitors use only a small percentage of the energy stored in them. Thus, when a power supply which has sufficient capacity to store energy at 85 V for operation over a number of cycles is used at the rated 220 V, only a small part of the energy stored in the capacitor is utilized.

However, providing a lengthy hold-up time in a prior art power supply, having its storage capacitors at the output of the rectifier bridge, imparts very rigorous requirements on the capacitors used for this function. Such capacitors must be voltage rated at the highest peak voltage expected when the mains power is at its maximum possible level, and at the same time must be of such a capacity that they can continue to supply the rated output of the power supply even if the mains power cuts off at a point in time when the voltage is at its minimum possible level. For example, considering a conventional power supply for use with a nominal 220 V AC mains supply. The range of voltages over which the power supply must operate correctly is from 180V to 260 V. In order to withstand the maximum peak voltage expected, the capacitor must be rated at 400 V. But in order to have sufficient storage to continue operation during voltage dropouts, the capacity must be such as to provide input current during the hold-up period when charged to a voltage of only 190 V. These two parameters therefore dictate high capacity and high working voltage for the capacitors used. The situation with a universal power supply operating from 85 V to 264 V is even more serious. Because of the excess capacity required to continue operation at the lower end of the voltage input range, when used at the nominal input voltage, such capacitors use only a small percentage of the energy stored in them. Thus, when a power supply which has sufficient capacity to store energy at 85 V for operation over a number of cycles is used at the rated 220 V, only a small part of the energy stored in the capacitor is utilized.

If the exemplary power supplies described hereinabove in this disclosure are adapted for use with lengthy hold-up times, an immediate advantage over prior art power supplies becomes evident. Since the main energy storage capacitors are located at the output of the first converter, they are always charged to the same nominal DC voltage, i.e. the output voltage of PWM1, regardless of the AC supply input voltage, such that the capacitor can be chosen to provide the exact required amount of energy to bridge the hold-up time, regardless of mains operating conditions. Thus even if the mains supply were to dip to its minimum value before dropping off completely, the storage capacitors of these power supplies will always be charged at essentially the same voltage level, namely the first converter rated output voltage. In other words, the effect of the first converter is to isolate the storage capacitors from the stability of the A/C mains power supply. Furthermore, the location of these storage capacitors at a lower voltage level point than the mains level means that lower voltage rated capacitors may be used. Both these features provide advantageous cost, physical size and performance to the exemplary power supplies described in this disclosure.

The selection of the storage capacitance to be used in such double module power supplies is conceptually the same whether hold-up time compensation is incorporated or not. The storage capacitors are intended to bridge the period when the input AC voltage is insufficient to provide the load with its current, whether it is the AC zero crossing point period, or whether it is the period when the AC supply fails complete. The criterion for the capacitance required is, of course, different from that described hereinabove, where the only consideration was that of the fall-off of voltage during the zero crossing point of the AC cycle. The criterion to be used now is that the storage capacitor be allowed to discharge a major part of its energy in order to continue operating the load through the second DC/DC converter, during the maximum hold-up time for which the power supply is designed to operate. This criterion obviously dictates the use of a larger capacitor than in the case of a power supply where no hold-up time is demanded, but it is still this feature of utilization of the majority of the energy stored within the capacitor, which delineates such operation from that of prior art power supplies with capacitors at their input. The difference is that the period during which this major part of the energy stored should be used is now the rated hold-up period, rather than a half cycle period. However, it is to be understood that a power supply equipped with a capacitor for providing a long hold-up time, no longer fulfils the optimum requirements of most efficient use of the storage capacity on a cycle-to-cycle level, and the capacitor will generally be of a larger value such that the criterion that the majority of the stored energy in the capacitor is used during each half cycle of the AC supply may no longer be fulfilled.

A number of numerical examples are now presented in order to illustrate the advantages of the exemplary power supplies described in this application, as relating to hold-up time.

The energy stored in a capacitor is given by: $E=V^2 \cdot C/2$. The energy that needs to be stored in a capacitor in order to supply enough energy for a given Hold-up time is given by the product of the Hold-up time and the output power. The rated voltage of the Hold-up Time capacitor is chosen according to the maximum input voltage, and its capacitance is chosen according to the minimum input voltage.

Three examples are considered:
1. A standard 220V prior art power supply (operating voltage 180-265 V)
2. A universal prior art power supply (85-265 V)
3. A power supply of the present application with a double converter topology 1. A 220V Power Supply:
The capacitor voltage rating is 400 V, but the capacitor is charged only to 370 V at the maximum expected peak voltage.
The total stored energy is $V^2 \cdot C/2 = 370^2 \cdot C/2 = 68,450 \cdot C$
In order to calculate the percentage of the actual stored energy in the capacitor relative to the total potentially stored energy, a 2-step calculation is performed:
(a)

The minimum peak input voltage $V2=(180 \cdot \sqrt{2}-2)=253$ V (The 2V is subtracted for the voltage drop across the rectifier diodes)

The maximum peak input voltage $V1=(265·\sqrt{2})=370$ V

The stored energy at the minimum voltage, without taking into account any voltage drop due to the hold-up time, relative to the total potential stored energy is therefore given by:

$(V2/V1)^2=(253/370)^2=47\%$.

Thus, at the minimum permissible AC mains voltage, the capacitor is storing only 47% of the energy which it could store at the maximum permitted mains voltage.

(b)

Now, account is taken of the drop in voltage arising from the hold-up time, during which no input current available and the capacitor voltage falls as the capacitor energy empties into the load. The maximum drop in available voltage while still considering the power supply as being functional is accepted as being 80 V for a nominally 220 V power supply. Thus the minimum capacitor voltage can fall 80 V from 253 V, i.e. to 173 V.

Therefore, the fraction of stored energy which is utilized by the end of the hold-up time, when the minimum capacitor voltage is 173 V, relative to that at the beginning of the hold-up time, when the minimum capacitor voltage is 253 V is given by:

$(253^2-153^2)/253^2=53\%$.

In conclusion, only 53% of the 47%, i.e. 25%, of the available stored energy in the capacitor is used in the case of a prior art AC/DC 220 volt standard power supply.

When the same calculations are performed for a universal input voltage power supply, nominally usable from 85 V to 265 V, the result is that only 6% of the available stored energy in the capacitor is used to transfer to the load during the duration of the hold-up time.

When these calculations are performed for the power supplies of the type described in this disclosure, since the nominal voltage on the output capacitor is essentially independent of changes in the AC supply voltage, if it were not for hold-up time considerations, the capacitor could be considered as having 100% of the energy stored in the capacitor utilized.

With regard to the hold-up time drop, the maximum drop in available voltage while still considering the power supply as being functional is accepted as being 19.5 V for a nominally 32 V power supply. Thus the minimum capacitor voltage can fall 19.5 V from 32 V, i.e. to 12.5 V.

Therefore, the fraction of stored energy which is utilized by the end of the hold-up time, when the minimum capacitor voltage is 12.5V, relative to that at the beginning of the hold-up time, when the minimum capacitor voltage is 32 V is given by:

$(32^2-12.5^2)/32^2=85\%$.

In conclusion, 85% of the available stored energy in the capacitor is used in this case, making such power supplies much more efficient in energy storage than prior art power supplies.

Calculations can also be performed in order to illustrate the difference in size of the capacitors used in power supplies of the present disclosure as compared with conventional standard power supplies. Using a 40 W power supply with a 20 msec. hold-up time as a typical example, the stored energy required to implement this hold-up time is given by the product of the Hold-up time and the output power:

$E=20 \times 10^{-3} \cdot 40=0.8$ Joule.

Taking into account the inefficiency of the power supply, the storage capacitor should be designed to supply about 0.9 Joule to enable the power supply to deliver an output sufficient to power its load during the hold-up time. Calculations show the following characteristics for the storage capacitor required for this 40 W power supply example:

(i) Standard 220 V prior art power supply:
   68 µF, 400V rating. Size is typically 20 mm dia.×35 mm. long
(ii) Universal 85 to 264 V prior art power supply:
   270 µF, 400V rating. Size is typically 30 mm dia.×40 mm. long
(iii) Universal power supply, constructed according to present application:
   2200 µF, 35V rating. Size is typically 16 mm dia.×25 mm. long.

As is observed, use of the novel power supply topology as described in the present disclosure enables the provision of required hold-up times using capacitors of significantly smaller dimensions, lower operating voltages and hence higher reliability, and lower costs than those of prior art power supplies.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

The invention claimed is:

1. A power supply for converting an AC supply to a DC output, said power supply comprising:
   a rectifier assembly connected to said AC supply, and providing a rectified current;
   a first converter inputting said rectified current, and providing a first DC output current at a voltage substantially below that of said AC supply;
   a second converter inputting said first DC output current, and providing a second DC output current; and
   at least one capacitor disposed at the output of said first converter for reducing the voltage drop of said first DC output current during zero-crossing of said input AC supply,
   wherein the capacitance of said at least one capacitor is such that a major part of its stored energy is discharged during every half cycle of said AC supply.

2. A power supply according to claim 1 and wherein said first converter inputs said rectified output current during at least a major part of each half cycle of said AC supply.

3. A power supply according to claim 1, and wherein said rectified current at the input to said first converter has a voltage drop during zero-crossing of the input AC supply, being a significant fraction of its peak voltage.

4. A power supply according to claim 1, and wherein said rectified current at the input to said first converter has a voltage drop during zero-crossing of the input AC supply, being at least 50% of its peak voltage level.

5. A power supply according to claim 1 and wherein said first converter provides an output voltage higher than that of said second converter.

6. A power supply according to claim 5 and wherein said first converter provides an output voltage at least one third higher than that of said second converter.

7. A power supply according to claim 5 and wherein the resulting reduced current flowing in said first converter reduces power dissipation therewithin.

8. A power supply according to claim 5 and wherein said second converter operates with an output to input voltage ratio sufficiently small that said second converter has an efficiency substantially higher than that which would be obtained if said rectified output current were input directly thereto.

9. A power supply according to claim 1, and wherein said at least one capacitor on the output of said first converter has a value such that said first DC output current has a voltage drop during zero-crossing of the input AC supply of at least 25% of the output voltage of said first converter when said power supply is providing a DC output current at its rated level.

10. A power supply according to claim 1, and wherein said at least one capacitor on the output of said first converter has a value such that said first DC output current has a voltage drop during zero-crossing of the input AC supply of at least 50% of the output voltage of said first converter when said power supply is providing a DC output current at its rated level.

11. A power supply according to claim 1, wherein said input by said first converter of rectified current during switch-on of said power supply reduces inrush current sufficiently that said power supply can dispense with the need of inrush current protection.

12. A power supply according to claim 1, wherein the utilization of rectified output current by said first converter over a major part of each cycle of said AC supply is operative to increase the power factor of said power supply.

13. A power supply according to claim 1, wherein said rectifier assembly and said first converter are disposed in a module physically separated from said second converter, and connected thereto by a flexible connection cord.

14. A power supply according to claim 13, wherein said module further comprises said at least one capacitor.

15. A power supply according to claim 13, wherein said module is part of a wall plug receiving AC power from a wall socket, and said second converter is part of a plug for connecting to a load device of said power supply.

16. A power supply according to claim 13, wherein said second converter is disposed within a mobile electronic device.

17. A power supply according to claim 13 further comprising a retractable reel, on which said connection cord is stored when not in use.

18. A power supply comprising:
at least first and second serially connected converters;
a first at least one capacitor connected across the output of said first converter;
a voltage detection element monitoring the voltage on said first at least one capacitor, causing said first converter to enter a sleep mode if said voltage on said first at least one capacitor exceeds a first predetermined level, and arousing said first converter from its sleep mode if said voltage on said first at least one capacitor falls below a second predetermined level;
a second at least one capacitor connected across the output of said second converter; and
a voltage detection element monitoring the voltage on said second at least one capacitor, causing said second converter to enter a sleep mode if said voltage on said second at least one capacitor exceeds a first preselected level, and arousing said second converter from its sleep mode if said voltage on said second at least one capacitor falls below a second preselected level.

19. A power supply according to claim 18 and wherein, when no load current is demanded therefrom, said first converter may be aroused to raise the voltage on said first at least one capacitor to said first predetermined level, and said second converter may be aroused to raise the voltage on said second at least one capacitor to said first preselected level.

20. A power supply according to claim 18 and wherein when no load current is demanded from said power supply, it enters a sleep mode with essentially no operating current expended other than that required to maintain responsivity of said converters to arousal signals, and that lost by component leakage.

21. A power supply according to claim 18 and wherein each one of said first and said second converters is adapted to provide current only down to predefined lower current limits, and wherein if the current drawn from said power supply falls below a second limit, lower than either of said predefined lower current limits of said converters, at least one of said converters enters a sleep mode until aroused to fill its at least one capacitor.

22. A power supply according to claim 21 and wherein said predefined lower current limit of either of said converters is chosen such that it provides current only at a level which maintains a minimum predefined power supply efficiency.

23. A power supply according to claim 21, wherein if the current drawn from said power supply falls below said second limit, said at least one converter provides current in bursts greater than its predefined lower current limit, and enters a sleep mode between bursts.

24. A power supply according to claim 18, wherein said first converter is physically separated from said second converter, said converters being connected by a connection cord.

25. A power supply according to claim 24, wherein said first converter is part of a wall plug receiving AC power from a wall socket, and said second converter is part of a plug for connecting to a load device of said power supply.

26. A power supply according to claim 24, further comprising a retractable reel, on which said connection cord is stored when not in use.

27. A switched mode power supply comprising:
an input for receiving a DC current;
switching circuitry for generating a high frequency AC current from said input DC current;
a high frequency transformer receiving said high-frequency AC current in a primary winding, said transformer having a secondary winding for outputting said high-frequency AC current at a desired voltage level;
a rectifier unit for rectifying said transformed said high-frequency AC current to a DC output current; and
an additional primary winding on said high-frequency transformer coupled magnetically to said secondary winding,
wherein a signal injected onto said secondary winding induces into said additional primary winding a signal electrically isolated from said secondary winding, and usable for control functions in said switched mode power supply.

28. A switched mode power supply according to claim 27, further comprising a rectifier assembly for connecting to an AC mains supply, for providing said DC input current.

29. A switched mode power supply according to claim 28, wherein said DC output current is isolated from said AC mains supply.

30. A switched mode power supply according to claim 28, wherein said DC output current is isolated from said AC mains supply without the need for an optocoupler.

31. A power supply for converting an AC supply to a DC output, said power supply comprising:
a rectifier assembly connected to said AC supply, and providing a rectified current;

a first converter inputting said rectified current, and providing a first DC output current at a voltage substantially below that of said AC supply;

a second converter inputting said first DC output current, and providing a second DC output current; and at least one capacitor disposed at the output of said first converter for reducing voltage drop in said first DC output current, wherein the capacitance of said at least one capacitor is such that said voltage drop in said first DC output current is limited so that said power supply continues to provide a predetermined output power level for a predetermined time period following cessation of said AC supply.

32. A power supply according to claim 31, wherein the capacitance of said at least one capacitor is such that a major part of its stored energy is discharged during said predetermined time period during which the power supply continues to provide a predetermined fraction of its output.

33. A power supply according to claim 31, wherein said at least one capacitor is charged to a predetermined constant voltage by said first converter essentially independent of allowable changes in the AC supply voltage.

34. A power supply according to claim 33, wherein said at least one capacitor is charged to a predetermined constant voltage by said first converter essentially independent of which AC supply voltage standard is used.

\* \* \* \* \*